United States Patent [19]

Djudin

[11] Patent Number: 5,441,460
[45] Date of Patent: Aug. 15, 1995

[54] GEAR BOX WITH ECCENTRIC PIEZOELECTRICALLY LINKED RING GEARS

[76] Inventor: Valery V. Djudin, ulitsa D. Bednogo, 110, Omsk, Russian Federation

[21] Appl. No.: 166,110

[22] Filed: Dec. 10, 1993

[51] Int. Cl.⁶ .................. F16H 3/093; F16D 27/102; H01L 41/053
[52] U.S. Cl. .................... 475/149; 475/162; 192/21.5
[58] Field of Search ............... 475/149, 154, 162, 169, 475/172, 173; 192/21.5

[56] References Cited

U.S. PATENT DOCUMENTS

| 627,383 | 6/1899 | Birrell | 475/173 |
| 2,026,880 | 1/1936 | Fliesberg et al. | 475/173 |
| 2,548,373 | 4/1951 | Hurvitz | 192/21.5 |
| 3,680,671 | 8/1972 | Hendershot et al. | 192/21.5 |

FOREIGN PATENT DOCUMENTS

| 98735 | 4/1989 | Japan | 475/149 |
| 3288044 | 12/1991 | Japan | 475/149 |
| 4146667 | 5/1992 | Japan | 192/21.5 |
| 444025 | 5/1975 | U.S.S.R. | |
| 1131685 | 12/1984 | U.S.S.R. | |

OTHER PUBLICATIONS

Platonov, V. I., "Full-Wheel-Drive Vehicles" Mashinostroenie Publishers, Moscow, FIG. 26, p. 92.
Platonov, V. I. "Full-Wheel Vehicles" Mashinostroenie Publishers, Moscow, pp. 162–163.

Primary Examiner—Charles A. Marmor
Assistant Examiner—Nathan O. Jensen
Attorney, Agent, or Firm—Ladas & Parry

[57] ABSTRACT

A gearbox comprises a row of parallely mounted disks. The mutually facing diametral planes of the disks are carrying cylindrical rings mounted coaxially to the rotation axes of the disks and provided with engaging elements on their internal and external cylindrical surfaces. Due to an offset between the neighboring disks providing for eccentricity between their parallel rotation axes all the rings located in the space between the diametral planes of the neighboring disks are in permanent engagement. Each ring is freely rotatable and is provided with means for its controlled interlocking with the disk carrying it.

4 Claims, 3 Drawing Sheets

GEAR BOX WITH ECCENTRIC PIEZOELECTRICALLY LINKED RING GEARS

FIELD OF THE INVENTION

The present invention relates to the field of automative industry and, more specifically, to gear-boxes, particularly, of automobiles.

BACKGROUND ART

It is known in the art to chance the economy of transport facilities by full loading the engine under all operating conditions. This is done, in particular, by developing more flexible transmission systems, by designing gear-boxes varying in the structural schemes and operating principles that permit controlling the loading of the engine depending on constantly varying external loads.

Mechanical fixed-ratio gear-boxes, most widely spread at present, mainly comprise a drive shaft, a driven shaft and an intermediate shaft, a set of gear-wheels, synchronizers and a gear-shifting mechanisms (V. I. Platonov "All-wheel-drive automobiles", 1969, Mashinostroenie Publishers, Moscow, p. 92, FIG. 26).

This type of transmission features a high efficiency and, to enhance the performance characteristics of automobiles, there is a tendency to improve the fixed-ratio gear-boxes by increasing the number of gears and removing discontinuity in the engine power stream in gear changing.

The solutions directed at increasing the number of gears in mechanical gear-boxes are, for example, SU Patent No. 1362882, 1986, and SU Patent No. 1131685, 1983. The gear-box of SU Patent No. 1362882 comprises a drive shaft and a driven shaft that carry gear wheels freely rotatable thereabout and engagable in pairs. Disposed between the gear wheels are five-position clutches that connect the gear wheels to each other and to the shaft. By varying the setting of the clutches and choosing the combination of their positions, it is possible to obtain a greater number of transmissions as against a conventional design with the same number of gear wheels.

Also known is a gear-box with an increased number of gears and a higher efficiency wherein gear-changing is ensured without discontinuing the power stream (SU Patent No. 1131685). Such a gearbox comprises two concentric primary shafts driven from two clutches, an intermediate shaft and a secondary shaft, gear wheels and couplings mounted on said shafts, said couplings connecting the gear wheels with the shafts. In order to transmit the power stream from the engine to the secondary shaft, two kinematic chains can be formed in such a design, and in order to shift gears without breaking the power stream, it is required, during operation of one kinematic chain from one of the clutches and from one of the primary shafts, to connect the second kinematic chain to the secondary shaft from the other clutch and the other primary shaft, and then to effect gear shifting by a smooth change of the clutches with overlap.

Increasing the number of gear wheels and introducing multiposition couplings, and thus making it possible to vary the pattern of connection of these gear wheels, are to some extent conducive to increasing the number of gears and excluding discontinuities in the power stream. This way, however, does not allow designing a conventional mechanical gear-box capable of readily responding to variations of an external load by instantaneously selecting the most favourable gear ratio for the most stable loading of the engine.

A gear-box is also known (SU Patent No. 444025, 1975), which comprises a drive shaft which carries concentrically mounted gear wheels, one on the cylindrical surface of the other, connected with each other through controlled clutches and having inner and outer ring gears, a casing accommodating concentric gear wheels freely rotatably and axially movably therein. It also has inner and outer ring gears arranged eccentrically with respect to said gear wheels and concentrically fitted on the drive shaft. In order to effect engagement of the outer and inner ring gears of some gear wheels respectively with the inner and outer ring gears of the other gear wheels, the gear-box is provided with control sliders, mounted in the casing, that shift that part of the gear wheels mounted on the casing which corresponds to the required gear, into a position of engagement with the ring gears. Placed between the ring gears of the wheels fitted on the drive shaft, of which the central wheel is connected with this shaft and the outer wheel is connected with a driven shaft, are control rods that are acted upon when the wheels mounted on the casing move axially so that the clutches are unlocked and, correspondingly, the required transmission is put in gear.

DISCLOSURE OF THE INVENTION

The present invention is based on the problem of providing a multiple-speed gear-box featuring a high efficiency, such a number of gears and such density of the row of gear ratios that they ensure the maximum loading of the engine under any power conditions irrespective of the road conditions (resistance to motion) and high-response gear shift without interrupting the engine power stream.

This problem is solved in that the drive and driven shafts of the multiple-speed gear-box are formed as parallel discs having their diametral planes facing each other, said discs having cylindrical rings mounted thereon by means of support members arranged on said planes concentrically with the axes of the discs, said rings carrying meshing members provided on the outer end inner cylindrical surfaces thereof. The parallel axes of rotation of the discs, that are also the axes of the cylindrical rings, are displaced relative to each other by the value of eccentricity E providing for a constant engagement of the outer and inner meshing members of the rings of one disc respectively with the inner and outer meshing members of the rings of another disc. All the cylindrical rings mounted in the support members are freely rotatable and capable of controlled blocking of each ring relative to its respective disc.

In a particular case, the support members are formed as concentric annular grooves. The meshing members, as in the form of ring gears provided on the inner and outer cylindrical surfaces of each ring, are disposed over the cylinder element with a shift towards one of its ends (top). The free end (base) of each ring is supported, via a radial thrust bearing, in the support annular groove of one disc, said groove corresponding to the diameter of this ring, and the other end, i.e. the top, bear, through a thrust bearing, against the diametral plane of another disc, thereby the meshing members of all the rings mounted in the above described manner being disposed in the space between the diametral parallel disc planes facing each other and, because of the eccentricity between the disc axes, being in constant consecutive engagement with each other. Each cylindrical ring in the support member is freely rotatable relative to the disc, either the ring base or the support member or both of them being fitted with a locking means that provides, at some definite time intervals, engagement of the ring with the disc carrying this ring and provides equalization of their angular speeds of rotation. For this purpose, the locking means is connected to the control system of locking.

Specifically, the locking means can be made as a piezoelectric ceramic annular insert secured on the internal cylindrical surface of the ring base installed in the disc groove. An annular electrode connected to a supply voltage source is placed on the internal surface of the groove on the side of the insert with insulation with respect to the disc body. The principle underlying the operation of the unit is the use of an inverse piezoelectric effect residing in the property of piezoelectric ceramics to change the geometrical dimensions under the influence of an electric field owing to the turning of internal domains in its structure depending on the electric field strength and the geometry of applying the electrodes on the ceramic articles. The required forces of locking with the aid of the piezoelectric ceramic annular insert are obtained in the solution to the problem according to the present invention due to changes of the insert radial dimensions as they are linearly dependent on the strength of the electric field when voltage is applied to the annular electrode (a potential difference is thereby produced between the electrode and the gear-box casing).

Simultaneous locking of two rings one of which is fitted on the drive disc and the other is on the driven disc is putting the transmission in gear.

Control of the order of locking, that is, shifting of gears, is effected by the locking control system. In the simplest case, the control system comprises two sliding contacts cutting any two annular electrodes of the locking means into the circuit of the voltage supply source. It is, however, advisable to use an electronic control system for gear shifting in the gear-box of the present invention. Application of an inverse piezoelectric effect in realizing the locking means opens up such possibilities. The electronic control system of locking provides instantaneous feeding of the control signal to actuating mechanisms and, hence, instantaneous gear shifting without breaking the power stream. This holds much promise for automation of automobile handling.

The locking unit and the control system for locking the rings with respect to the discs in the present gear-box can be of any known design meeting the requirements of reliable and controllable engagement of the ring and disc.

The meshing members on the inner and outer cylindrical surfaces of the rings in the form of ring gears are made so that the cylindrical rings are in constant consecutive engagement which is implemented, for example, with utilization of a magnetoelectric effect, friction or other phenomena.

The shafts made as parallel and eccentrically mounted discs and the cylindrical rings carrying the meshing members and mounted on the ends of the shafts, i.e. on the diametral faces of the discs, provide a compact mechanical gear-box with the number of gears greater than can be obtained in similar arrangements with conventional mounting of the same number of shafts and gear wheels. Because of the individual locking of each cylindrical ring with respect to the disc which carries the ring, the structure of the present invention ensures gear shifting in any succession since the transfer of the torque is possible from the drive disc to any disc and then, via the meshing members, to any ring of the driven disc and from any ring of the driven disc to this disc.

In this case, double use of the gear-box takes place, i.e. upshifting and downshifting.

An increased number of gears and the minimum difference in the gearing ratios between the steps provide greater possibilities for the engine performance conditions to approach the optimum ones by increasing the loading factor by the employment, at the required moment, of the gear ensuring its most efficient operation depending on the environmental conditions. When applying the electronic control system of locking the rings, which provides instantaneous gear changing and overlapping of the operation of the gear by another, breaking of the power stream is avoided in the gear-box design of the present invention.

A considerable increase in the number of gears with simultaneous convergence of the gearing ratios between the gears in the gear-box of the present invention is achieved by parallel mounting on the side of the driven disc, of additional similar driven discs. The axis of rotation of each subsequent disc in such a row is eccentric with respect to the axis of rotation of the preceding disc, and the concentric support members with cylindrical rings mounted therein and carrying the meshing members are disposed on both diametral faces of each driven disc, with the exception of the last one.

Thus, in each space between the faces of the parallel discs, there is formed a kinematic chain made up of cylindrical rings meshed in succession, each ring being capable of freely rotating relative to the disc carrying said ring, and being adapted to be locked with respect to that disc. An increase in the engine loading factor when the additional driven discs are introduced in the gear-box is due to a greater number of gears, which is equal to the product of the maximum number of gears of the kinematic chain by the maximum number of gears in the subsequent kinematic chain formed between the parallel discs. In this case, the first (or several first) kinematic chain will serve in the gear-box as a complex multi-stage divider from each stage of which its own row of gears can be obtained for the subsequent kinematic chains. As a result of the fact that the total amount of gears increases much more rapidly than the maximum gearing range of the gear-box grows when additional discs and additional kinematic chains between them are used, a still greater convergence of the maximum interval in the gearing ratio between the adjacent gears occurs. Compaction of the gearing range of the gear-box takes place by increasing considerably the number of gears in the range.

Actually, with a fixed-ratio gear-box, the maximum utilization of power is only possible in some discrete points when the frequency of rotation of the engine crankshaft is maximum, in all the rest cases the power is not utilized to a full extent (V. F. Platonov, "All-wheel-drive Automobiles", 1989, Mashinostroenie Publishers, Moscow, p. 162). The gear-box design of the present invention ensures a substantial increase of the number of such discrete points which will rise to such a value that these points almost merge into a solid line, that is, the claimed design materially increases the engine loading factor, makes it possible to utilize its power more effectively, which, in turn, results in improvement of the performance characteristics of the transport means.

BRIEF DESCRIPTION OF THE DRAWINGS

The invention will now be described with reference to specific embodiments thereof taken in conjunction with the accompanying drawings, in which.

A POSSIBLE EMBODIMENT OF THE INVENTION

Figure 1:
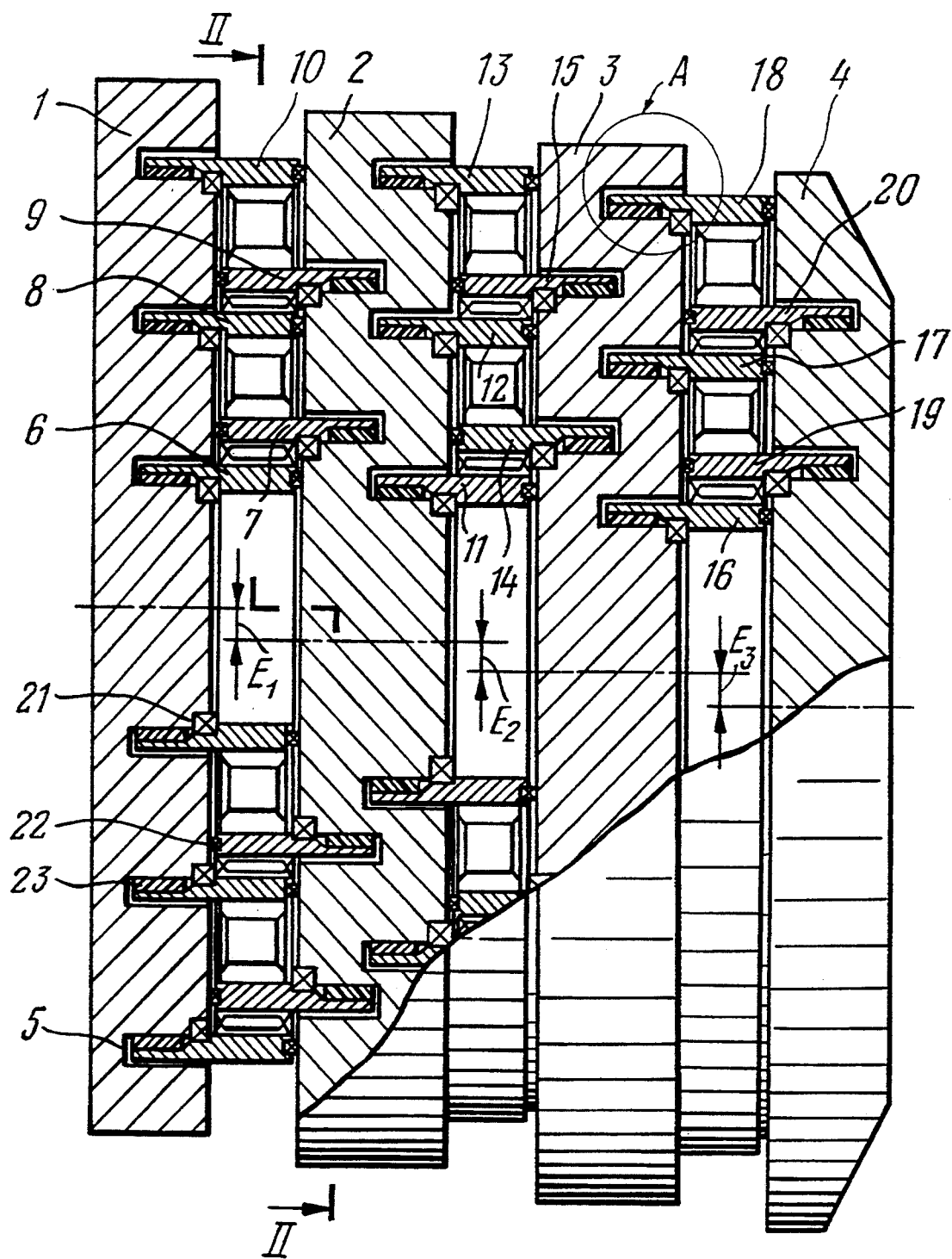
FIG. 1 is a general sectional view of the gear-box of four discs.
Figure 2:
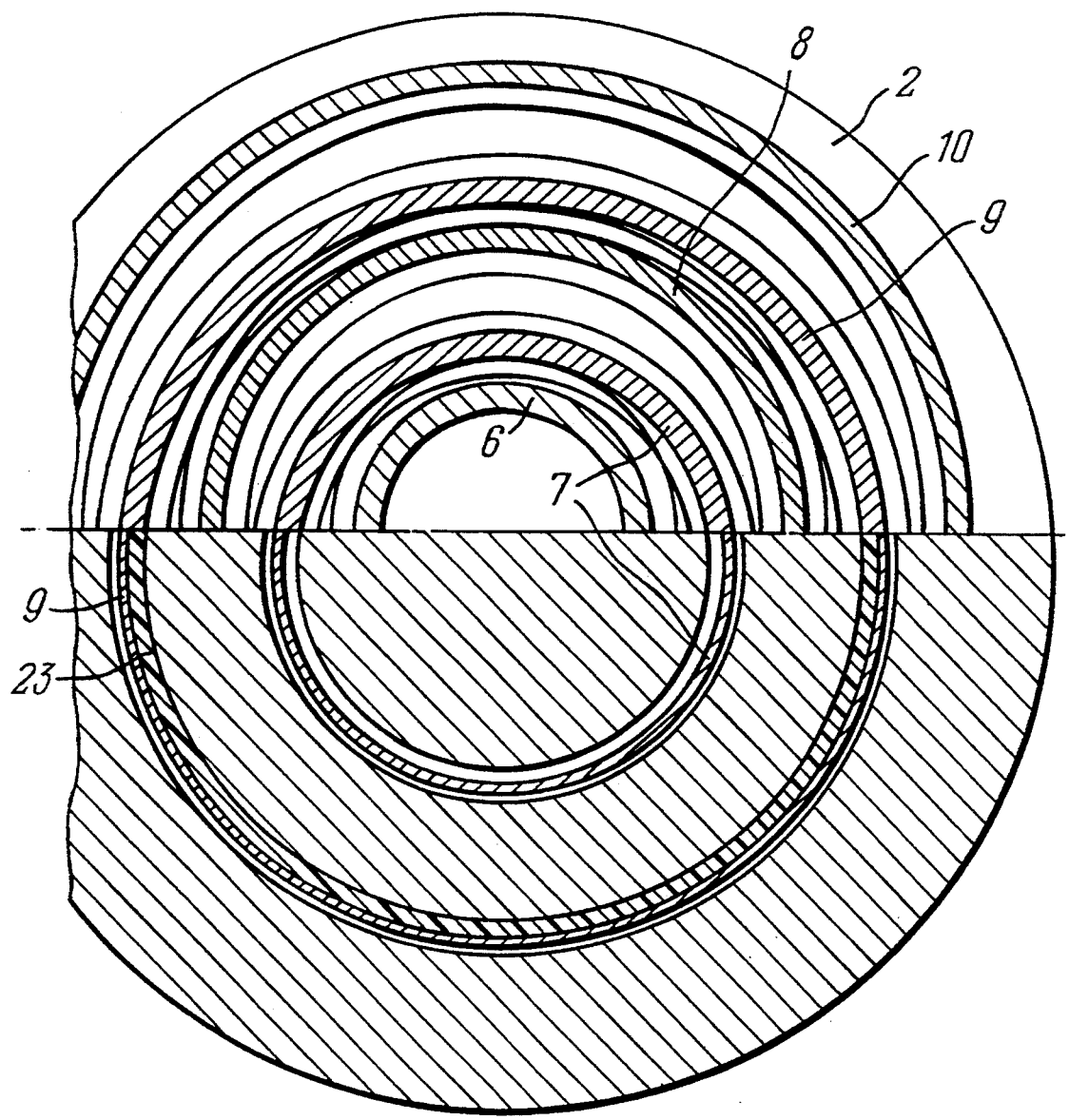
FIG. 2 is a stepped section along II—II of FIG. 1.

The gear-box illustrated in the accompanying drawings comprises parallel discs 1, 2, 3 and 4 accommodated within a casing (not shown in the drawings). The disc 1 is a drive disc connected with the engine of a transport facility (the connection is not shown). The disc 2 is a driven disc with respect to the disc 1, but it is a drive disc with respect to the subsequent disc 3. Similarly, the disc 3 is a driven disc with respect to the disc 2 but it is a drive disc with respect to the disc 4 next in this row. The axis of rotation of the disc 2 is parallel to the axis of rotation of the disc 1 and is shifted with respect to it by the value of eccentricity $E_1$. The axis of the disc 3 is displaced by the same value $E_2$ with respect to the axis of the disc 2 parallel to the axis of disc 3, and the same holds for the axis of the disc 4, which is parallel to the axis of the disc 3. The opposite diametral faces of all the discs are provided with annular grooves 5 that are concentric with their asex of rotation and serve as the setting members for the cylindrical rings. The outer and inner cylindrical surfaces of the rings are provided with ring gears displaced over the cylinder element towards one of its ends (top). With its free end (base), each ring is placed in the annular groove 5 corresponding to the ring diameter. The ring gears of the rings mounted on the opposite diametral disc faces are accommodated in the space between the faces, and, owing to the setting of the adjacent discs with eccentricities $E_1$, $E_2$, $E_3$ between their axes, these ring gears are in constant engagement and form a chain. The outer ring gear of one ring meshes the inner ring gear of the ring mounted on another disc with an eccentricity and, the outer ring gear in the sector diametrally opposite to the preceding engagement sector meshes, in turn, the inner ring gear of the ring next over the diameter, which is mounted on the originally mentioned disc. Specifically, the outer ring gear of a ring 6 mounted on the face of the disc 1 that is opposite to the disc 2 moves into mesh with the inner ring gear of the disc 1 the outer ring gear in the diametrally opposite sector moves into mesh with the inner ring gear of a ring 8 of the disc 1. Finally, the outer ring gear of the ring 8 similarly interacts with the inner ring gear of a ring 9 of the disc 2, the outer ring gear of which moves, in turn, into engagement with the inner ring gear of a ring 10 mounted on the face of the disc 1.

In a similar manner, rings 11, 12, 13 interact in the space between the diametral faces of the discs 2 and 3, said rings being mounted in support members on the face of disc 2 that is opposite to the disc 3, similarly interact rings 14, 15 on the face of the disc 3 facing the disc 2, rings 16, 17, 18 of the disc 3 and rings 19, 20 of the disc 4 interact similarly. That is, in the space between the discs, all the rings are in constant consecutive internal engagement, forming in each such space a kinematic chain with different angular velocities of rotation of the cylindrical rings.

The rings in the space between the discs are arranged with outward thrust due to free mounting of each ring with its base in a corresponding annular groove 5 in the disc which carries the ring by means of a radial thrust bearing 21, and with its top the ring bears, through a thrust bearing 22, against the diametral face of the adjacent disc.

Figure 3:
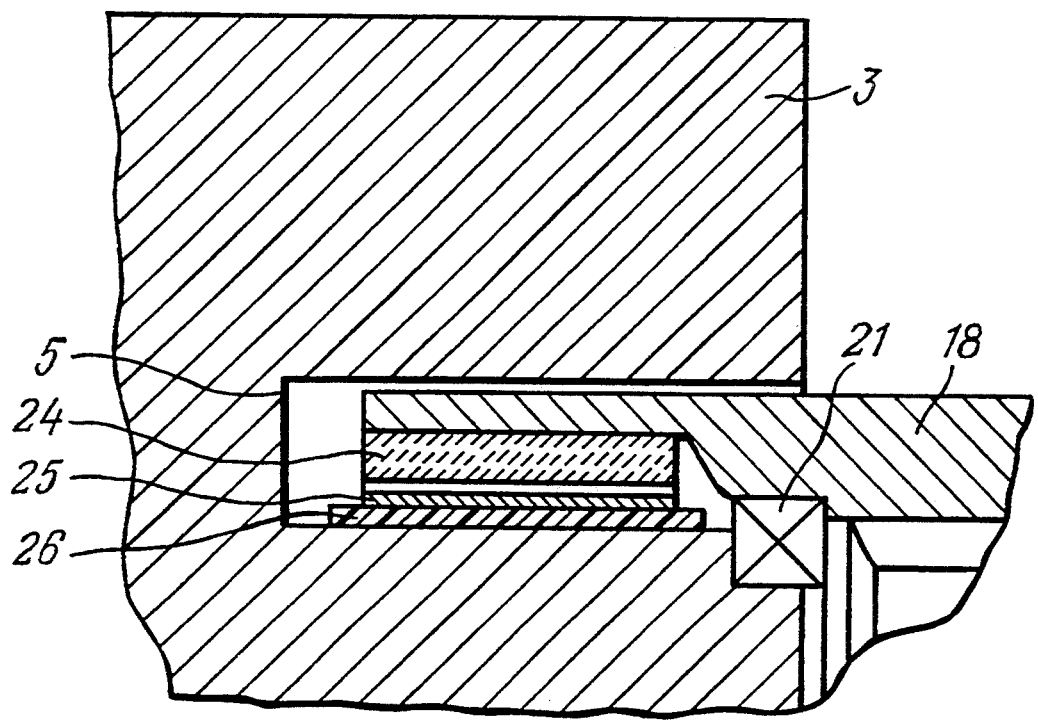
FIG. 3 is an enlarged view of unit "A" of FIG. 1.

The base of each ring is mounted in the corresponding annular groove in the disc with a clearance and is provided with a means 23 for locking this ring with respect to the disc which carries the ring. The locking means (FIG. 3) comprises a piezoelectric ceramic annular insert 24 (as of TsTBC-3 grade ceramics, "Handbook on Electrotechnical Materials" edited by Koritsky, V. 3, Leningrad Elekroatom Publishers, 1988, pp. 580 to 590) secured over the interminal diameter of the ring base and an electrode 25 disposed on the inner surface of the groove 5 of the disc on the side of the insert 24, said electrode being insulated from the disc by a packing 26 and being electrically connected via a control system to a source of voltage supply (the connection and control system are not shown in the drawings).

The gear-box operates as follows.

The torque is transmitted from the engine to the drive disc 1 and causes its rotation. Therewith, all the rings in the support members rotate freely with respect to the discs that carry them (neutral transmission), whereas the torque is not transmitted to the discs 2, 3. A voltage is simultaneously fed by the control system and electrical connections to the electrodes 25 of the locking means of any of the following ring pairs arranged between the faces of the discs 1 and 2, 6 and 7, 6 and 9, 8 and 7, 8 and 9, 10 and 7, 10 and 9, 11 and 14, 11 and 15, 12 and 14, 12 and 15, 13 and 15, 16 and 19, 16 and 20, 17 and 19, 17 and 20, 18 and 19 and, 18 and 20. Between the ring base and electrode fed with a voltage, a strong electric field is created and causes the piezoelectric ceramic insert 24 to deform in a radial direction (i.e. its outer diameter increases) due to the inverse piezoelectric effect and regular polarization of the ceramics. As a result of the forces arising when the radial dimensions increase, radial pressure is exerted on the internal cylindrical surface of the thin-walled ring base (these pressures can be as high as 200 kg/cm$^2$). The ring base is deformed in the radial direction, the clearance being selected to be less than the value defined by the elastic deformation of the base material, and locking of the ring and disc takes place due to their friction engagement. As a result of the locking, the torque is transmitted from the drive disc 1 to the locked ring of this disc, and, since all ring gears of the rings disposed in the space between the discs are in constant consecutive engagement, the torque is transmitted to all the rings of the kinematic chain between the discs 1 and 2. Locking of the ring 7 or ring 9 with respect to the disc 2 ensures transmission of the torque to the disc 2, locking of any two pairs of the rings with respect to their discs in the chain between the discs 2 abd 3 ensures transmission of the torque to the disc 3, and in the chain between the discs 3 and 4 to the disc 4. The transmission is put in gear. In order to change the gear, it is required to remove voltage by means of the control system from the locking means electrodes of the locked ring pairs and apply it to other electrodes. Selection of the ring pairs that have to be locked to put the transmission in gear is determined by the choice of the required gear-box ratio at the given instant of time, depending on the external conditions, which ensures the maximum engine loading.

INDUSTRIAL APPLICABILITY

The invention claimed can be used in the transmission of transport means, particularly of automobiles.

I claim:

1. A gear-box comprising a casing which accommodates a drive shaft with cylindrical rings (6, 8, 10) mounted concentric with the shaft axis, the outer and inner cylindrical surfaces of the rings carrying meshing members in cooperation, respectively, with the inner and outer meshing members of similar concentric rings (7, 9); the common axis of the rings having an eccentricity (E) to the drive shaft axis; and a driven shaft, characterized in that said drive shaft and said driven shaft are formed as parallel discs (1, 2) with their diametral plane facing each other, said discs having their axes of rotation displaced relative to each other by the value of the above-mentioned eccentricity; and having support members (21), concentrically disposed on the diametral planes, for cylindrical rings (6, 7, 8, 9, 10), the bases of said rings being mounted in said support members (21) so that each ring (6, 8, 10) is freely rotatable relative to its disc (1); and the tops of said rings, carrying said meshing members that are in constant cooperation, being disposed in the space between the discs (1, 2); the bases of said rings (6, 7, 8, 9, 10) or the support members, or both of them, being provided with means (23) for locking said rings (6, 7, 8, 9, 10) with respect to their discs (1, 2), said locking means being connected to a locking control system.

2. A gear-box as claimed in claim 1, characterized in that, on the side of the driven shaft there is provided with at least one more similar driven disc having its axis eccentric to the axis of an adjacent disc, the concentric support members (21) with cylindrical rings (11, 12, 13, 14, 15) mounted in said support members and carrying meshing members being disposed on both diametrical planes of each disc (2, 3), with the exception of the outermost one.

3. A gear-box as claimed in claim 1, characterized in that said support members (21) are annular grooves made in the body of the discs, each cylindrical ring (6 to 20) being a gear wheel with inner and outer ring gears and a sleeve-like boss freely mounted in the annular groove of a corresponding diameter, and said locking means (23) is made as a piezoelectric ceramic annular insert (24) secured on the cylindrical surface of the sleeve-like boss and mounted on the internal surface of the groove, an annular electrode (25) being placed on the side of the insert (24) with insulation (26) from the disc body so as to be periodically electrically connected to a source of supply voltage.

4. A gear-box as claimed in claim 2, characterized in that said support members (21) are annular grooves made in the body of the discs, each cylindrical ring (6 to 20) being a gear wheel with inner and outer ring gears and a sleeve-like boss freely mounted in the annular groove of a corresponding diameter, and said locking means (23) is made as a piezo-electric ceramic annular insert (24) secured on the cylindrical surface of the sleeve-like boss and mounted on the internal surface of the groove, an annular electrode (25) being placed on the side of the insert (24) with insulation (26) from the disc body so as to be periodically electrically connected to a source of supply voltage.

* * * * *